US011365882B2

(12) United States Patent
Yoshida

(10) Patent No.: US 11,365,882 B2
(45) Date of Patent: Jun. 21, 2022

(54) GAS COMBUSTION TREATMENT DEVICE, COMBUSTION TREATMENT METHOD, AND GAS PURIFICATION SYSTEM INCLUDING GAS COMBUSTION TREATMENT DEVICE

(71) Applicant: Mitsubishi Heavy Industries Engineering, Ltd., Kanagawa (JP)

(72) Inventor: Kaori Yoshida, Tokyo (JP)

(73) Assignee: Mitsubishi Heavy Industries Engineering, Ltd., Kanagawa (JP)

(*) Notice: Subject to any disclaimer, the term of this patent is extended or adjusted under 35 U.S.C. 154(b) by 293 days.

(21) Appl. No.: 16/635,773

(22) PCT Filed: Jul. 4, 2018

(86) PCT No.: PCT/JP2018/025382
§ 371 (c)(1),
(2) Date: Jan. 31, 2020

(87) PCT Pub. No.: WO2019/069519
PCT Pub. Date: Apr. 11, 2019

(65) Prior Publication Data
US 2021/0025588 A1 Jan. 28, 2021

(30) Foreign Application Priority Data
Oct. 4, 2017 (JP) .............................. JP2017-194472

(51) Int. Cl.
*B01D 53/00* (2006.01)
*B01D 53/52* (2006.01)
(Continued)

(52) U.S. Cl.
CPC ............. *F23G 7/06* (2013.01); *B01D 53/005* (2013.01); *B01D 53/52* (2013.01); *F23J 15/006* (2013.01);
(Continued)

(58) Field of Classification Search
CPC ...... B01D 53/52; B01D 53/005; B01D 53/75; B01D 53/76; B01D 2251/206;
(Continued)

(56) References Cited

U.S. PATENT DOCUMENTS 3,822,337 A   7/1974  Wunderlich et al.
4,007,129 A * 2/1977  Naber .................... B01D 53/14
                                                             252/373
(Continued)

FOREIGN PATENT DOCUMENTS

CN       1280581 C      10/2006
CN       101193690 A     6/2008
(Continued)

OTHER PUBLICATIONS

First Office Action in corresponding Chinese Application No. 201880050413.7, dated Apr. 6, 2021 (16 pages).
(Continued)

*Primary Examiner* — Timothy C Vanoy
(74) *Attorney, Agent, or Firm* — Osha Bergman Watanabe & Burton LLP

(57) ABSTRACT

A gas combustion treatment device that subjects an ammonia-containing gas, a hydrogen cyanide-containing gas, and a hydrogen sulfide-containing gas to combustion treatment includes: a first combustion unit configured to introduce therein fuel, the ammonia-containing gas, the hydrogen cyanide-containing gas, and air and burn and reduce the fuel and the gases at an air ratio lower than 1; a second combustion unit provided downstream of the first combustion unit and configured to burn and reduce, in a reducing atmosphere, nitrogen oxide in a first combustion gas sent from the first combustion unit; and a third combustion unit provided downstream of the second combustion unit and configured to introduce therein hydrogen sulfide-containing
(Continued)

gas with air in addition to a second combustion gas sent from the second combustion unit.

8 Claims, 4 Drawing Sheets

(51) Int. Cl.
  *F23G 7/06* (2006.01)
  *F23J 15/00* (2006.01)
  *F23J 15/04* (2006.01)

(52) U.S. Cl.
  CPC ........... *F23J 15/04* (2013.01); *B01D 2251/11* (2013.01); *B01D 2258/0283* (2013.01)

(58) Field of Classification Search
  CPC ........ B01D 2251/11; B01D 2258/0283; C01B 3/34; C01B 3/50; C10K 1/101; C10K 1/002; C10K 1/34; C10K 1/10; C10K 1/004; C10K 1/006; F23G 2207/30; F23G 2202/10; F23G 2202/102; F23G 7/06; F23G 5/16; F23G 2204/103; F23G 7/065; F23G 2215/20; F23G 5/12; F23G 2209/14; F23G 2202/101; F23G 2202/103; F23G 2202/105; F23J 15/006; F23J 15/04; F23J 2215/10; F23J 2215/20; F23J 7/00; F23J 15/003
  See application file for complete search history.

(56) References Cited

U.S. PATENT DOCUMENTS

| | | | |
|---|---|---|---|
| 4,395,390 A | | 7/1983 | Desgrandchamps et al. |
| 5,112,586 A | * | 5/1992 | Baker ................. B01D 53/145 |
| | | | 423/220 |
| 2003/0108831 A1 | | 6/2003 | Harada et al. |
| 2004/0091409 A1 | * | 5/2004 | Allison .................... C10K 1/12 |
| | | | 423/220 |
| 2006/0141414 A1 | | 6/2006 | Harada et al. |
| 2009/0211401 A1 | | 8/2009 | Zendejas-Martinez et al. |
| 2010/0077767 A1 | | 4/2010 | Balmas et al. |
| 2012/0107208 A1 | | 5/2012 | Ohara et al. |
| 2014/0248202 A1 | | 9/2014 | Betlem et al. |

FOREIGN PATENT DOCUMENTS

| | | |
|---|---|---|
| CN | 1995402 B | 11/2011 |
| CN | 102666809 A | 9/2012 |
| CN | 103796735 A | 5/2014 |
| CN | 105169943 A | 12/2015 |
| JP | 2002-243132 A | 8/2002 |
| JP | 2003-130326 A | 5/2003 |
| JP | 2006-232904 A | 9/2006 |
| WO | 2006-106289 A1 | 10/2006 |

OTHER PUBLICATIONS

Extended European Search Report issued in corresponding European Application No. 18865259.8, dated Jul. 17, 2020 (9 pages).
The Examination Report issued in corresponding Indian Application No. 202017004179, dated Jul. 23, 2020 (6 pages).

* cited by examiner

GAS COMBUSTION TREATMENT DEVICE, COMBUSTION TREATMENT METHOD, AND GAS PURIFICATION SYSTEM INCLUDING GAS COMBUSTION TREATMENT DEVICE

CROSS-REFERENCE TO RELATED APPLICATION

This application is a national stage of PCT International Application No. PCT/JP2018/025382 filed in Japan on Jul. 4, 2018, which claims priority to and incorporates by reference the entire contents of Japanese Patent Application No. 2017-194472 filed in Japan on Oct. 4, 2017.

FIELD

The present application relates to a gas combustion treatment device, a combustion treatment method, and a gas purification system including the gas combustion treatment device.

BACKGROUND

For example, when coal is gasified and used as a fuel for electric power generation, sulfur compounds (e.g., hydrogen sulfide, carbonyl sulfide) and nitrogen compounds such as ammonia are contained in product gas, which are removed in wet purification equipment from the viewpoint of pollution prevention and corrosion prevention. The hydrogen sulfide ($H_2S$) removed in this wet purification equipment is stripped off and discharged as an off-gas containing a high concentration of the hydrogen sulfide ($H_2S$ off-gas). The ammonia ($NH_3$) that has been recovered is similarly stripped off and discharged as an off-gas containing ammonia ($NH_3$ off-gas). A hydrogen sulfide-containing gas and an ammonia gas discharged as off-gases are introduced into a direct-burning type combustion device, for example, and are subjected to combustion treatment (Japanese Patent Application Laid-open No. 2003-130326). By using this direct-burning type combustion device, the hydrogen sulfide-containing gas and the ammonia gas can be treated in a single system, whereby the treatment system can be simplified.

SUMMARY

However, there is a problem in which the product gas produced by gasifying coal also contains hydrogen cyanide (HCN), and a hydrogen cyanide-containing gas is formed as a cyanogen off-gas from waste-water treatment equipment which treats waste water from which ammonia has been stripped off. When the cyanogen concentration of this cyanogen off-gas is low, the cyanogen off-gas can be diluted with air to be released into the atmosphere. However, when the cyanogen concentration of the cyanogen off-gas is high, there is a problem in which, although the cyanogen off-gas is treated in a common combustion furnace, it is difficult to decrease formation of NOx.

Thus, it is eagerly desired to develop a technique for treating all of an ammonia-containing gas, the hydrogen cyanide-containing gas, and the hydrogen sulfide-containing gas in a single treatment device.

A gas combustion treatment device, a combustion treatment method, and a gas purification system including the gas combustion treatment device are provided.

According to one aspect of the present application, there is provided a gas combustion treatment device configured to subject an ammonia-containing gas, a hydrogen cyanide-containing gas, and a hydrogen sulfide-containing gas to combustion treatment comprising: a first combustion unit configured to introduce therein fuel, the ammonia-containing gas, the hydrogen cyanide-containing gas, and air to burn and reduce the fuel and the gases at an air ratio lower than 1; a second combustion unit provided downstream of the first combustion unit and configured to burn and reduce, in a reducing atmosphere, nitrogen oxide in a first combustion gas sent from the first combustion unit; and a third combustion unit provided downstream of the second combustion unit and configured to introduce therein the hydrogen sulfide-containing gas with air in addition to a second combustion gas sent from the second combustion unit and burn the gases.

According to one aspect of the present application, there is provided a gas combustion treatment method for subjecting an ammonia-containing gas, a hydrogen cyanide-containing gas, and a hydrogen sulfide-containing gas to combustion treatment comprising: a first combustion step of introducing fuel, the ammonia-containing gas, the hydrogen cyanide-containing gas, and air for burning and reducing the fuel and the gases at an air ratio lower than 1; a second combustion step, performed downstream of the first combustion step, for burning and reducing, in a reducing atmosphere, nitrogen oxide in a first combustion gas sent from the first combustion step; and a third combustion step, performed downstream of the second combustion step, for introducing the hydrogen sulfide-containing gas with air in addition to a second combustion gas sent from the second combustion step, and for burning the gases.

According to one aspect of the present application, there is provided a gas purification system comprising: a gasification power plant including a gasification furnace configured to produce a product gas from fuel and an oxidizing agent; a carbonyl sulfide (COS) conversion unit configured to convert COS in the product gas produced in the gasification furnace into hydrogen sulfide; a water-washing unit provided downstream of the COS conversion unit and configured to wash the product gas; a hydrogen sulfide removal column provided downstream of the water-washing unit and configured to remove hydrogen sulfide in the product gas; an ammonia removal unit configured to remove ammonia in waste water sent from the water-washing unit; a waste-water treatment unit configured to treat the waste water from which ammonia has been removed; and the gas combustion treatment device described above configured to subject a gas containing hydrogen sulfide from the hydrogen sulfide removal column, a gas containing ammonia from the ammonia removal unit, and a gas containing hydrogen cyanide from the waste-water treatment unit to combustion treatment.

The above and other objects, features, advantages and technical and industrial significance of this application will be better understood by reading the following detailed description of presently preferred embodiments of the disclosure, when considered in connection with the accompanying drawings.

DETAILED DESCRIPTION OF THE PREFERRED EMBODIMENT

Preferred embodiments of the present application will now be described in detail with reference to the attached drawings. It should be noted that the present application is not limited to these embodiments and also, if the embodiments are provided in plurality, the present application includes all combinations of these embodiments.

First Embodiment

Figure 1:
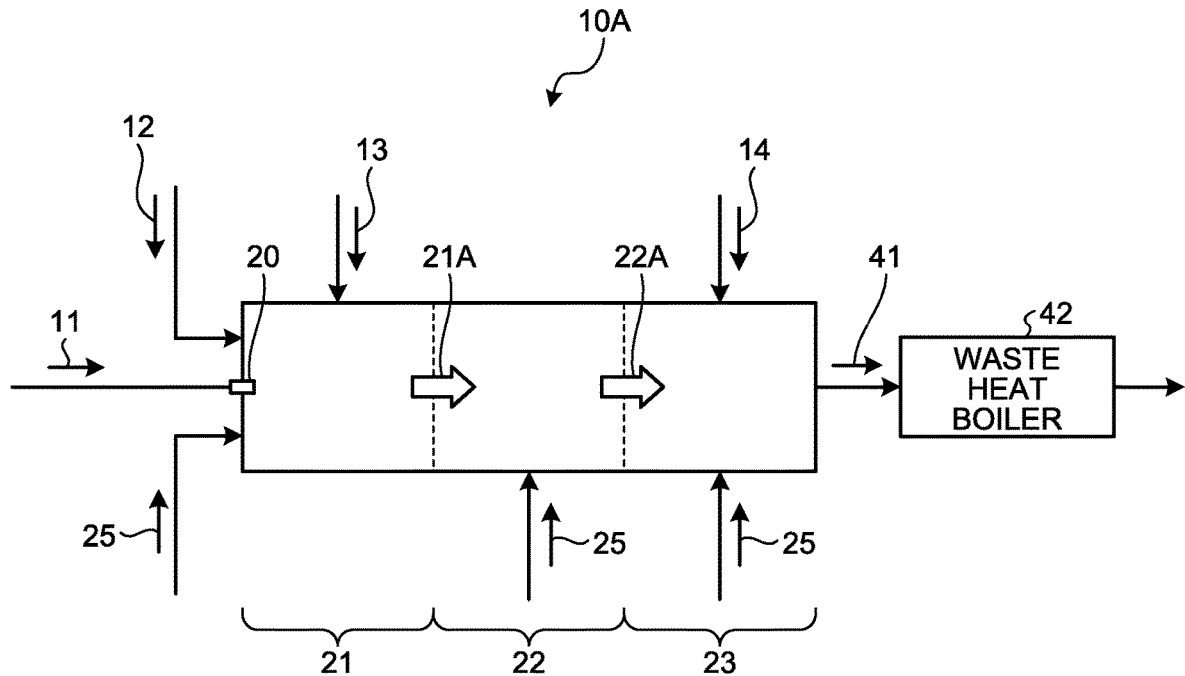
FIG. 1 is a diagram schematically illustrating a schematic configuration of a gas combustion treatment device according to a first embodiment of the present application.

FIG. 1 is a diagram schematically illustrating a schematic configuration of a gas combustion treatment device according to a first embodiment of the present application. As illustrated in FIG. 1, this gas combustion treatment device 10A according to the present embodiment is a gas combustion device that subjects an ammonia-containing gas 12, a hydrogen cyanide-containing gas 13, and a hydrogen sulfide-containing gas 14 to combustion treatment, and includes: a first combustion unit 21 configured to introduce therein fuel 11, the ammonia-containing gas 12, the hydrogen cyanide-containing gas 13, and air 25 and burn and reduce the fuel and the gases at an air ratio lower than 1; a second combustion unit 22 provided downstream of the first combustion unit 21 and configured to burn and reduce, in a reducing atmosphere, nitrogen oxide in the first combustion gas 21A sent from the first combustion unit 21; and a third combustion unit 23 provided downstream of the second combustion unit 22 and configured to introduce therein the hydrogen sulfide-containing gas 14 with air 25 in addition to second combustion gas 22A sent from the second combustion unit 22 and burn the gases. Herein, the air ratio is a value obtained by dividing an amount of air supplied for burning the fuel 11 by a theoretical amount of air.

In the first combustion unit 21, the ammonia ($NH_3$)—containing gas 12 and the hydrogen cyanide-containing gas 13 are introduced with the fuel 11. Because this gas combustion treatment device 10A is of a direct-burning type, the fuel 11 is introduced in order to cause combustion in a combustion furnace, and this fuel is injected from a nozzle 20 of a combustion burner. At the same time as this introduction of the fuel 11, air 25 or the like is introduced to burn the fuel 11, ammonia in the ammonia-containing gas 12, and hydrogen cyanide in the hydrogen cyanide-containing gas 13 in the first combustion unit 21.

A combustion temperature in the first combustion unit 21 is set within a high-temperature range of 1250° C. to 1500° C., for example, and more preferably a high-temperature range of 1300 to 1400° C. Combustion treatment performed in such a high-temperature range (approximately 1250° C. to 1500° C.) is preferable since formation of NOx from ammonia is suppressed to a low level. By setting this high-temperature range, the introduced ammonia is exposed to high temperature in the first combustion unit 21, and the ammonia is subjected to complete combustion treatment to be decomposed into nitrogen ($N_2$) and water ($H_2O$).

When an oxidizing atmosphere is created in the first combustion unit 21, a decomposed nitrogen content forms NOx. In order to prevent the oxidizing atmosphere from being created, combustion is performed in the first combustion unit 21 under a reducing condition in which the air ratio is set lower than 1. Thus, the air ratio is set lower than 1, preferably set to 0.6 to 0.9, for example, and more preferably set to 0.6 to 0.8. When the air ratio is set excessively low, preferred reactivity cannot be maintained, and thus the lower limit thereof is approximately 0.6.

Gas introduction positions of the ammonia-containing gas 12, the hydrogen cyanide-containing gas 13, and the air 25 to be introduced into the first combustion unit 21 are not limited to particular ones.

In the gas combustion treatment device 10A, in the first combustion unit 21 that is an initial stage portion thereof, the $NH_3$ off-gas and the hydrogen cyanide off-gas are subjected to complete combustion treatment to be decomposed into nitrogen and water in a reducing atmosphere first. Ammonia to be supplied herein is introduced in a form of ammonia gas. For example, when this device is used in a system for gasified coal gas, the ammonia-containing gas 12 recovered by an ammonia removal unit (denoted by the reference sign 111 in FIG. 6 described later) configured to remove ammonia in waste water is not condensed, and is introduced into the first combustion unit 21 in a form of gas without being processed. Hydrogen cyanide off-gas from a waste-water treatment unit (denoted by the reference sign 113 in FIG. 6 described later) configured to treat waste water from which ammonia gas has been removed by the ammonia removal unit is introduced as the hydrogen cyanide-containing gas 13 into the first combustion unit 21.

The first combustion gas 21A that has been burned in the first combustion unit 21 is sent to the downstream second combustion unit 22 without being processed. In the second combustion unit 22 that is a nitrogen oxide reduction unit, nitrogen oxide in the first combustion gas 21A sent from the first combustion unit 21 is reduced in a reducing atmosphere. Herein, since a trace amount of nitrogen oxide (NOx) is formed when the ammonia ($NH_3$) and the hydrogen cyanide (HCN) are subjected to combustion treatment in the first combustion unit 21, NOx is reduced into $N_2$ in a reducing atmosphere in the second combustion unit 22, whereby NOx contained in a trace amount in the first combustion gas 21A is decreased.

That is, the reducing atmosphere is created in the second combustion unit 22 into which the first combustion gas 21A is introduced. This is because, in order to continue high-temperature combustion in the first combustion unit 21, additional fuel 11 needs to be introduced and burned, and the fuel is burned to such an extent that an oxidizing atmosphere is not created. However, a trace amount of NOx is formed therein when the fuel is partially oxidized. Thus, by intentionally creating a reducing atmosphere in the second combustion unit 22, NOx contained in the first combustion gas 21A is reduced into $N_2$.

The combustion temperature in the second combustion unit 22 is 1300° C. to 1600° C., for example, and more preferably 1400° C. to 1500° C., for example. The air ratio in the second combustion unit 22 is set lower than 1, preferably set to 0.7 to 0.9, and more preferably set to 0.8 to 0.9.

By adding air 25 into the second combustion unit 22 to increase the air ratio more than the air ratio in the first combustion unit 21, unburned $NH_3$ present in the first combustion gas 21A can be burned, whereby the amount of unburned $NH_3$ can be minimized.

Thus, when the air ratio in the first combustion unit 21 is 0.7 to 0.8, for example, the air ratio in the second combustion unit 22 is preferably adjusted to 0.8 to 0.9, for example. When the air ratio in the first combustion unit 21 is 0.8 to 0.9, for example, the air ratio in the second combustion unit 22 is preferably adjusted to 0.85 to 0.95, for example.

Herein, the hydrogen sulfide-containing gas 14 is not introduced into the second combustion unit 22 since reduction treatment of NOx is exclusively performed therein.

The second combustion gas 22A the NOx concentration of which has been decreased in the second combustion unit 22 is further sent to the downstream third combustion unit 23. In this third combustion unit 23, the hydrogen sulfide-containing gas 14 additionally introduced is introduced with air 25 and is burned.

Since hydrogen sulfide gas can be treated at a low-temperature range (800° C. or higher), the hydrogen sulfide-containing gas 14 is subjected to combustion treatment to be decomposed into water ($H_2O$) and sulfur dioxide ($SO_2$) in an oxidizing atmosphere.

The temperature in the third combustion unit 23 is usually set to approximately 800° C. to 900° C., which is a temperature in which the hydrogen sulfide usually burns by itself. The hydrogen sulfide is a substance that easily burns at a high temperature equal to or higher than a certain temperature even if the concentration thereof is low, and burns by itself at a temperature of 800° C. or higher. Thus, the hydrogen sulfide is mixed with the second combustion gas 22A sent from the second combustion unit 22 (nitrogen oxide reduction unit) and having a temperature of 1000° C. or higher, which is used as a heat source to burn the hydrogen sulfide.

As for the amount of air in the third combustion unit 23, it is preferable to adjust the introduction amount of the air 25 such that the oxygen concentration in flue gas 41 discharged from the third combustion unit 23 is 0.8 to 2.5 volume %, and preferably 1.0 to 2.0 volume %.

The hydrogen sulfide-containing gas 14 introduced therein has a high content concentration in the gas and a high calorie, and thus the fuel 11 is usually unnecessary for combustion. However, fuel 11 may be added additionally if necessary.

According to the present embodiment, in the gas combustion device having three continuous combustion units, in the first combustion unit 21, the ammonia-containing gas 12 and the hydrogen cyanide-containing gas 13 are subjected to combustion treatment in the reducing combustion atmosphere, and thus the combustion treatment can be performed with NOx hardly being formed. Subsequently, in the second combustion unit 22, NOx formed in a trace amount is subjected to reduction treatment, and then in the third combustion unit 23, the hydrogen sulfide-containing gas 14 is introduced and subjected to combustion treatment in the oxidizing atmosphere. This enables the single gas combustion treatment device 10A to efficiently treat all gases.

Second Embodiment

Hereinafter, in the present embodiment, with reference to FIG. 2, a mode will be described, in which the hydrogen sulfide-containing gas 14 is introduced also into the second combustion unit 22 and is subjected to combustion treatment. Herein, members that are the same as those of the gas combustion treatment device in the first embodiment are designated by the same reference signs, and duplicate description thereof is omitted. In the gas combustion treatment device 10A in FIG. 1, the hydrogen sulfide-containing gas 14 is not introduced into the second combustion unit 22 and reduction treatment of NOx is prioritized. In the present embodiment, the hydrogen sulfide-containing gas 14 may be introduced also into the second combustion unit 22 and be subjected to combustion treatment.

Figure 2:
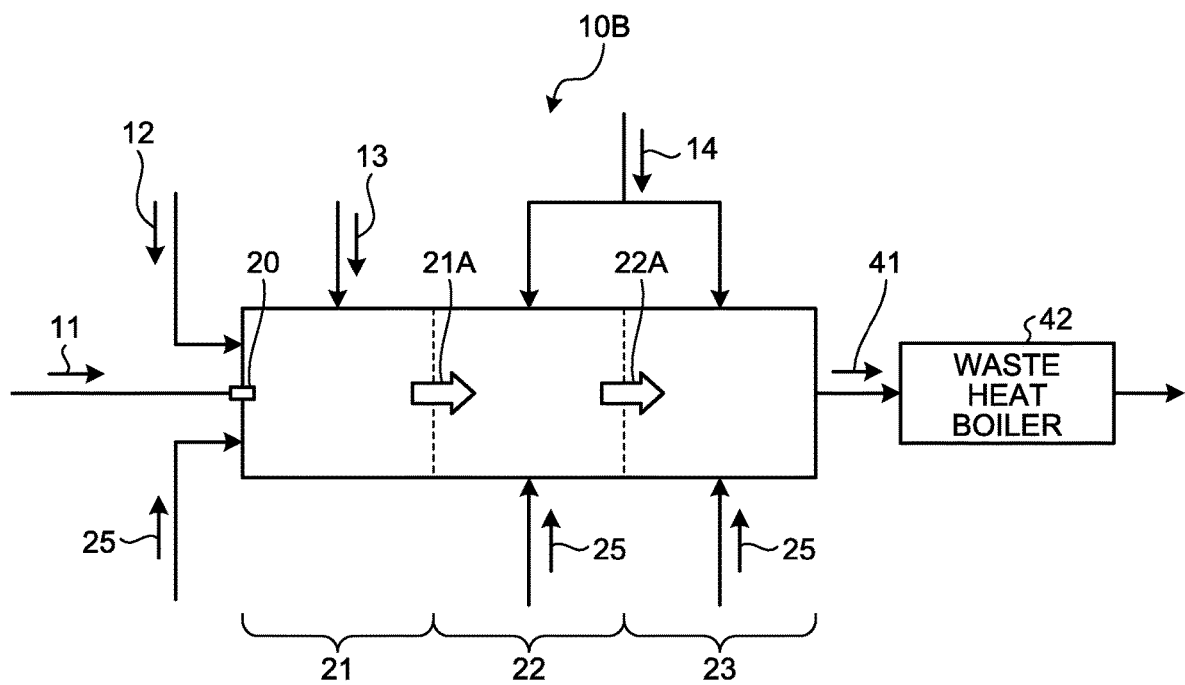
FIG. 2 is a diagram schematically illustrating a schematic configuration of a gas combustion treatment device according to a second embodiment of the present application.

FIG. 2 is a diagram schematically illustrating a schematic configuration of a gas combustion treatment device according to the second embodiment of the present application. In this gas combustion treatment device 10B illustrated in FIG. 2, a line for introducing the hydrogen sulfide-containing gas 14 is divided, and the hydrogen sulfide-containing gas 14 is introduced into the second combustion unit 22 and the third combustion unit 23. At this time, the amount of excessive oxygen in the first combustion gas 21A flowing down from the first combustion unit 21 to the second combustion unit 22 is preferably controlled usually in a range of approximately 0.1 to 3 mol %, and more specifically in a range of approximately 0.5 to 1 mol %. This control facilitates amount control of the hydrogen sulfide-containing gas 14 introduced in order to convert the atmosphere of the second combustion unit 22 into a reducing atmosphere.

A ratio of the hydrogen sulfide-containing gas 14 introduced into the second combustion unit 22 and a ratio of the hydrogen sulfide-containing gas 14 introduced into the third combustion unit 23 are optionally determined since the ratios vary depending on properties, contents, and the like of the gases to be treated, and are not limited to particular ones. For example, for hydrogen sulfide gas treatment in a gas purification system for gasified coal gas, a mode usually preferred is such that 5 to 20 volume % of the hydrogen sulfide-containing gas is introduced into the second combustion unit 22 and 80 to 95 volume % thereof is introduced into the third combustion unit 23. Herein, for the combustion treatment of the hydrogen sulfide, introduction of the fuel 11 into the second combustion unit 22 is not necessary. This is because the combustion temperature in the second combustion unit 22 is 1300° C. to 1600° C., for example, and thus the introduced hydrogen sulfide burns by itself.

The combustion temperature in the second combustion unit 22 is 1300° C. to 1600° C., for example, and more preferably 1400° C. to 1500° C., for example. The air ratio in the second combustion unit 22 is set lower than 1, preferably set to 0.7 to 0.9, and more preferably set to 0.8 to 0.9.

The temperature in the third combustion unit 23 is usually 800° C. to 1300° C., and more preferably 900° C. to 1100° C., for example. As for the amount of air in the third combustion unit 23, it is preferable to adjust the introduction amount of the air 25 such that the oxygen concentration in the flue gas 41 discharged from the third combustion unit 23 is 0.8 to 2.5 volume %, and preferably 1.0 to 2.0 volume %.

According to the present embodiment, the hydrogen sulfide-containing gas 14 is introduced also into the second combustion unit 22. However, when the amount of NOx formed in the first combustion unit 21 is small, NOx is subjected to reduction treatment and also a small amount of hydrogen sulfide is burned, whereby the introduction amount of the hydrogen sulfide-containing gas 14 to be treated in the third combustion unit 23 is decreased and the combustion treatment can be effectively performed in the oxidizing atmosphere. This enables the single gas combustion treatment device 10B to efficiently treat all gases.

Third Embodiment

Hereinafter, in the present embodiment, with reference to FIG. 3, another mode of supplying fuel to be supplied to the first combustion unit 21 will described. Herein, members that are the same as those of the gas combustion treatment device in the first embodiment are designated by the same reference signs, and duplicate description thereof is omitted. For the fuel 11 to be supplied to the first combustion unit 21 in the first embodiment, one nozzle 20 is used as a fuel introduction unit as illustrated in FIG. 1. However, the present application is not limited to this, and a plurality of the nozzles may be provided.

Figure 3:
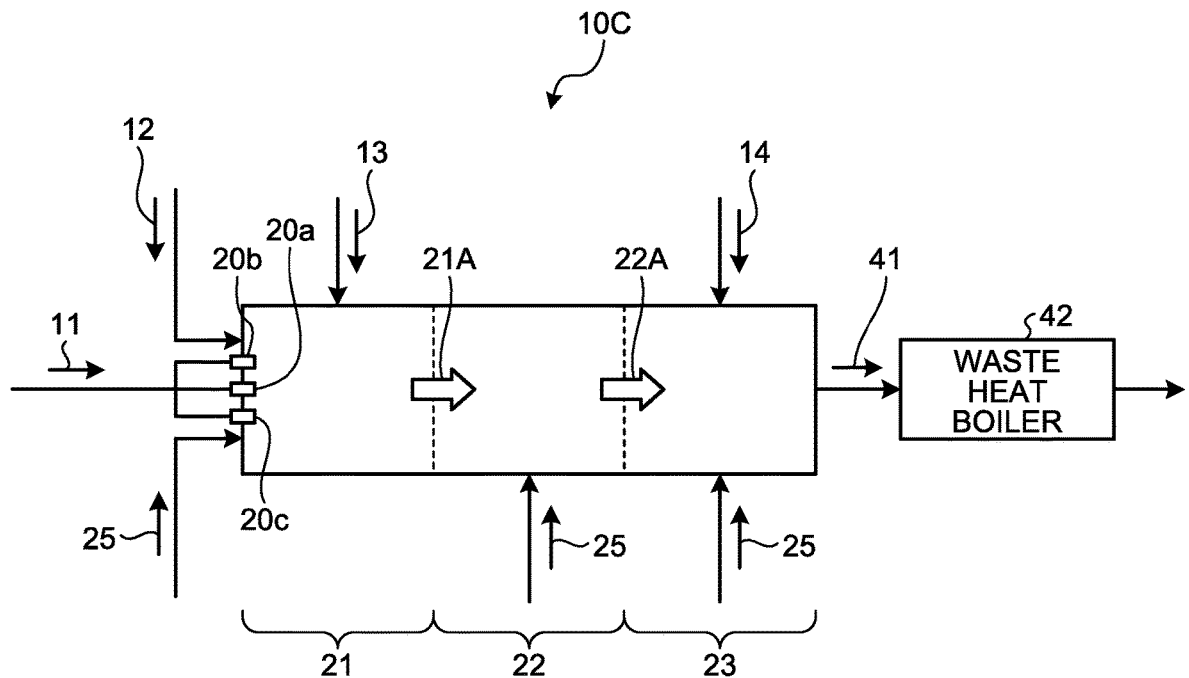
FIG. 3 is a diagram schematically illustrating a schematic configuration of a gas combustion treatment device according to a third embodiment of the present application.

FIG. 3 is a diagram schematically illustrating a schematic configuration of a gas combustion treatment device according to the third embodiment of the present application. As illustrated in FIG. 3, three introduction lines for fuel to be introduced into the first combustion unit 21 are provided. For example, a center nozzle is a main nozzle 20a, sub-nozzles 20b and 20c are disposed on both sides thereof, and the ratio of fuel to be supplied to the sub-nozzles 20b and 20c is changed. As for the ratio of this change, for example, when the amount of fuel to be supplied to the main nozzle 20a is 70% of the total supplied amount, the fuel ratio for the sub-nozzle 20b is set to 20% and the fuel ratio for the sub-nozzle 20c is set to 10%. A variety of combinations of combustion conditions thus can be increased. For example, when the supplied amount of the fuel 11 is small, the fuel is supplied only to the main nozzle 20a. Alternatively, the main nozzle 20a is used in combination with the sub-nozzle 20b or with the sub-nozzle 20c. This enables fine adjustments at the time of starting-up a plant and the time of stopping the plant, for example. The fuel ratio may be changed appropriately.

With this configuration, excessive combustion (at 1500° C. or higher) such as combustion with one nozzle as in the gas combustion treatment device 10A in FIG. 1 can be prevented.

Furthermore, compared with the case where one burner is provided, finer adjustment of combustion in addition to adjustment of the supplied amount of the fuel 11 can be performed. Thus, the amount of gas to be treated can be adjusted such that an optimum combustion temperature is achieved.

According to the present embodiment, a plurality of nozzles each of which is a fuel-supplying point are provided, whereby the combustion temperature can be adjusted for the amount of the gas to be treated. By managing the combustion temperature, formation of NOx in the first combustion unit 21 and formation of SOx in the third combustion unit 23 can be suppressed.

Fourth Embodiment

Hereinafter, in the present embodiment, another mode of supplying the air 25 to be introduced into the first to third combustion units 21 to 23 will be described. Herein, members that are the same as those of the gas combustion device in the first embodiment are designated by the same reference signs, and duplicate description is omitted. In the present embodiment, in order to adjust the air 25 to be supplied to the first to third combustion units 21 to 23, the oxygen concentration in the flue gas 41 discharged from the exit side of the third combustion unit 23 is monitored with an oxygen analyzer.

Figure 4:
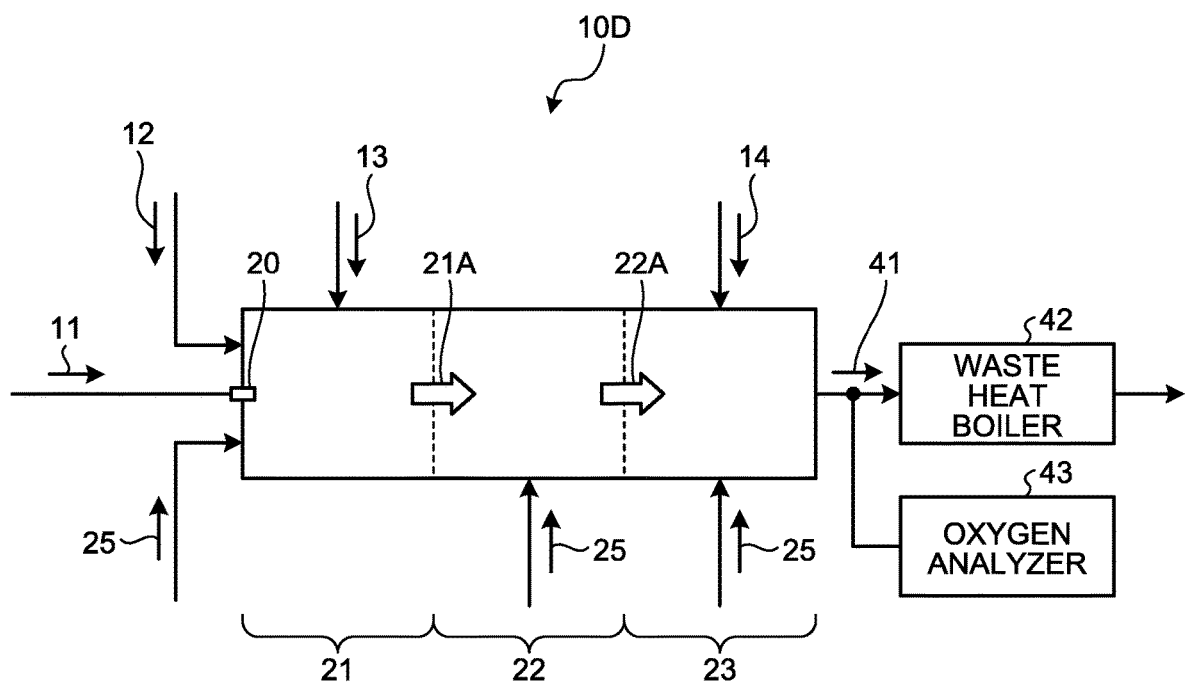
FIG. 4 is a diagram schematically illustrating a schematic configuration of a gas combustion treatment device according to a fourth embodiment of the present application.

FIG. 4 is a diagram schematically illustrating a schematic configuration of a gas combustion treatment device according to the fourth embodiment of the present application. As illustrated in FIG. 4, an oxygen analyzer 43 is installed in the discharge line of the flue gas 41 discharged from the third combustion unit 23 so as to measure the oxygen concentration in the flue gas 41. Based on the amount of off-gas (the ammonia-containing gas 12, the hydrogen cyanide-containing gas 13) introduced into the first combustion unit 21 and the second combustion unit 22 and the amount of air, the amount of air required in the third combustion unit 23 is determined with an arithmetic processing unit (not illustrated) such that the oxygen concentration in the flue gas 41 at the exit of the third combustion unit 23 becomes a target value. In response to instructions of a control device (not illustrated), the air 25 is introduced into the third combustion unit 23 such that the determined amount of air is achieved. Thus, it is possible to subject the hydrogen sulfide-containing gas 14 to combustion treatment while controlling the oxygen concentration appropriately.

According to the present embodiment, with the oxygen analyzer 43 installed, while controlling the oxygen concentration in the flue gas 41, it is possible to reliably perform combustion treatment of the ammonia-containing gas 12, the hydrogen cyanide-containing gas 13, and the hydrogen sulfide-containing gas 14 introduced into the respective combustion units 21 to 23.

In the gas combustion treatment device of the present application, since gas having a temperature near 900° C. is discharged as the flue gas 41, heat can be recovered by installing a waste heat boiler (WHB) 42, for example, on a downstream side of the combustion furnace. An amount of $SO_3$ formed as a result of combustion of hydrogen sulfide ($H_2S$) in a direct-burning type combustion furnace is larger than that in a storage type combustion furnace. Since $SO_3$ forming dust cannot be sufficiently removed with a flue-gas desulfurizer (not illustrated) installed downstream thereof, in the case of using a direct-burning type combustion furnace, equipment capable of removing $SO_3$ is required to be installed on the downstream side of the combustion furnace. Specifically, flue gas from the direct-burning type combustion furnace is subjected to heat recovery until the flue gas is cooled to approximately 300° C. by the waste heat boiler (WHB) 42, and is brought into contact with $SO_3$ and water in a wet cooling tower (not illustrated) and recovered as sulfuric acid. Substantially 100% of $SO_3$ dissolves in water. Sulfuric acid mist is formed in this wet cooling tower (not illustrated), and the sulfuric acid mist cannot be sufficiently removed by the downstream flue-gas desulfurizer (not illustrated). Thus, a wet electrostatic precipitator (EP) (not illustrated) is provided downstream of the wet cooling tower (not illustrated) so as to electrostatically precipitate the sulfuric acid mist.

Fifth Embodiment

Figure 5:
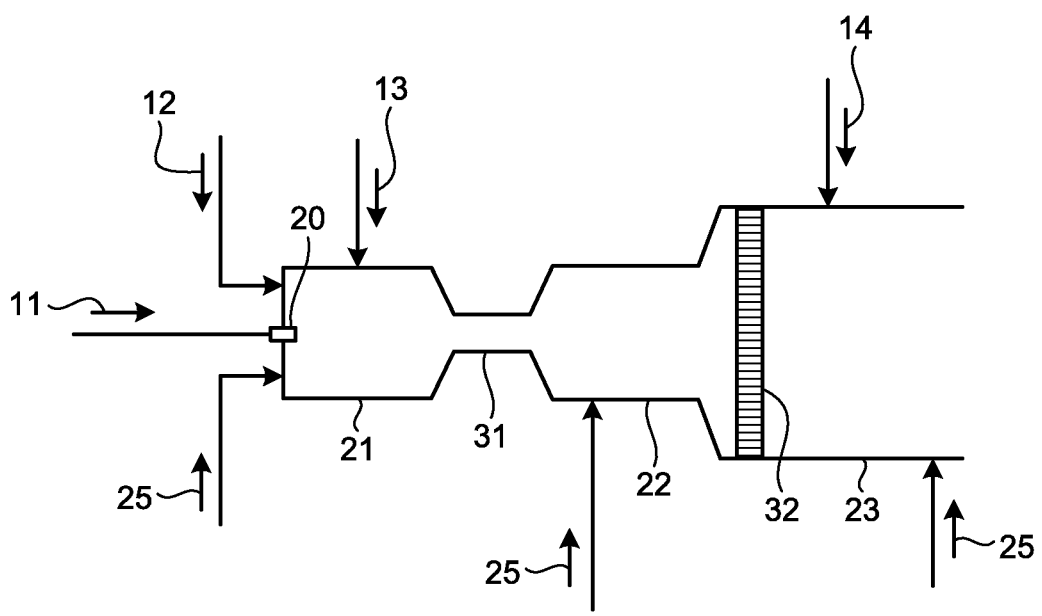
FIG. 5 is a diagram schematically illustrating one example of a configuration of a gas combustion treatment device according to a fifth embodiment of the present application.

By using the gas combustion treatment device of the present application as described above, the ammonia-containing gas 12, the hydrogen cyanide-containing gas 13, and the hydrogen sulfide-containing gas 14 can be subjected to combustion treatment in a single combustion treatment device in significantly efficient manner More specifically, a mode having a device structure as illustrated in FIG. 5, for example, may be used as one example, although the structure thereof is not limited to the present embodiments. Herein, members that are the same as those of the gas combustion device in the first embodiment are designated by the same reference signs, and duplicate description thereof is omitted.

FIG. 5 is a diagram schematically illustrating a schematic configuration of a gas combustion treatment device according to the fifth embodiment of the present application. As illustrated in FIG. 5, between the first combustion unit 21 and the second combustion unit 22, a narrow part (narrowed part) 31 is formed. This narrow part (narrowed part) 31 allows gases to flow therethrough and be mixed easily. On an inlet side of the third combustion unit 23, a partition portion 32 is disposed. This partition portion 32, which is made of a high-temperature ceramic material or the like, serves as a radiation shield such as a perforated plate for radiation shielding, and creates a temperature difference between the second combustion unit (nitrogen oxide reduction unit) 22 and the third combustion unit 23.

With the device structure of the present embodiment, the first combustion gas 21A introduced into the second combustion unit 22 can flow therethrough and be mixed satisfactorily. Furthermore, the combustion temperature is made different between the second combustion unit 22 and the third combustion unit 23, and this temperature difference is achieved by installing the partition portion 32.

Such a process significantly decreases environmental loads. The gases to be treated in the present application are not limited to particular ones, and gases including the ammonia-containing gas 12, the hydrogen cyanide-containing gas 13, and the hydrogen sulfide-containing gas 14 are to be treated in a broad sense. Specifically, examples thereof include gasified coal gas containing a high proportion of the ammonia-containing gas 12, the hydrogen cyanide-containing gas 13, and the hydrogen sulfide-containing gas 14.

Sixth Embodiment

In a system using coal to be gasified as a fuel for electric power generation, the gas combustion treatment devices 10A to 10D of the present application can be used, as part of the system, as a combustion furnace for an off-gas of a coal-gasified-gas by wet purification on the downstream side of a hydrogen sulfide removal step using amine. In such a system in which the ammonia-containing gas and the hydrogen sulfide-containing gas need to be treated simultaneously, the use of the treatment devices of the present application as described above can facilitate treatment of the respective off-gases in a significantly efficient manner Specifically, the above-described combustion devices can be preferably used at a combustion step in a purification system illustrated in FIG. 6.

Figure 6:
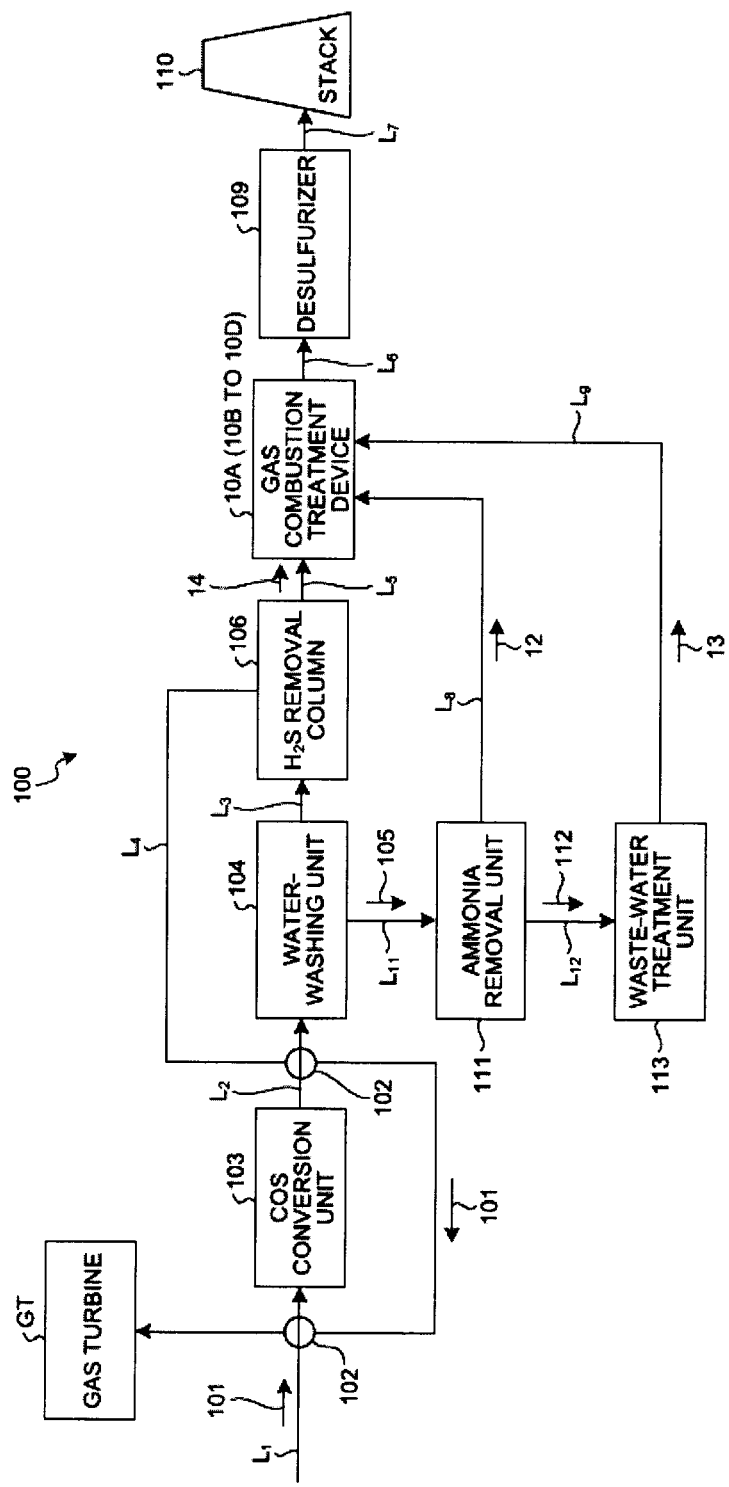
FIG. 6 is a diagram schematically illustrating one example of a gas purification system in which a gas combustion treatment device according to a sixth embodiment of the present application is preferably used.

The following describes one example of a gas purification system in which a combustion device according to the present embodiment is preferably constructed with reference to FIG. 6. FIG. 6 is a diagram schematically illustrating one example of the gas purification system in which a gas combustion treatment device according to the sixth embodiment of the present application is preferably used. The gas purification system 100 is installed side by side with a coal gasification power plant configured to gasify coal to use the gas as a fuel for electric power generation. As illustrated in FIG. 6, for example, the gas purification system 100 includes: a gasification power plant (not illustrated) including a gasification furnace configured to produce a product gas 101 from fuel and an oxidizing agent; a carbonyl sulfide (COS) conversion unit 103 configured to convert COS in the product gas 101 produced in the gasification furnace into hydrogen sulfide ($H_2S$); a water-washing unit 104 provided downstream of the COS conversion unit 103 and configured to wash the product gas 101; a $H_2S$ removal column 106 provided downstream of the water-washing unit 104 and configured to remove hydrogen sulfide in the product gas 101; the ammonia removal unit 111 configured to remove ammonia in waste water 105 sent from the water-washing unit 104; and the waste-water treatment unit 113 configured to treat waste water 112 from which ammonia has been removed. The reference signs $L_1$ to $L_9$ denote gas lines, and $L_{11}$ to $L_{12}$ denote waste-water lines.

The product gas 101 produced in the gasification furnace (not illustrated) is cooled by a heat exchanger 102 disposed on a path of the gas line $L_1$, and carbonyl sulfide (COS) in the resulting gas is converted into $H_2S$ by the COS conversion unit 103. Subsequently, the resulting gas is cooled by a heat exchanger 102, and almost all ammonia contained in the gas is taken into the waste water 105 by the water-washing unit 104 disposed on a path of the gas line $L_2$. The product gas 101 from which ammonia ($NH_2$) has been removed and subjected to washing treatment is sent to the $H_2S$ removal column 106 through a gas line $L_3$, and $H_2S$ is removed. The $H_2S$ removal column 106 has a configuration in which sulfur compounds such as $H_2S$ and COS contained in the product gas 101 that has been subjected to washing treatment with an absorbent are removed to a level equal to or lower than an allowable concentration for a gas turbine (GT).

The absorbent that has absorbed sulfur compounds in the $H_2S$ removal column 106 is sent to an absorbent regenerator (not illustrated), and is regenerated by heating and desorbing the absorbed $H_2S$. The product gas 101 from which $H_2S$ has been removed is heated by the respective heat exchangers (e.g., GGH) 102 and 102 disposed on the path of the gas line $L_4$, and is supplied to the gas turbine (GT). The hydrogen sulfide-containing gas 14 containing $H_2S$ is supplied to the gas combustion treatment device 10A (10B to 10D) and subjected to combustion treatment, and then is desulfurized by a desulfurizer 109 configured to treats sulfur oxide contained in flue gas and is discharged to outside the system through a stack 110. Meanwhile, $NH_3$ that has been taken into waste water by the water-washing unit 104 is introduced to the ammonia removal unit 111 through a waste-water line $L_{11}$, and the waste water 112 that has been subjected to gas-liquid separation in the ammonia removal unit 111 is sent to the waste-water treatment unit 113 through a waste-water line $L_{12}$. The ammonia-containing gas 12 that is an off-gas containing $NH_3$ from the ammonia removal unit 111, the hydrogen cyanide-containing gas 13 that is an off-gas from the waste-water treatment unit 113, and the hydrogen sulfide-containing gas 14 from the $H_2S$ removal column 106 are supplied to the gas combustion treatment device 10A (10B to 10D) through gas lines $L_5$, $L_8$, and $L_9$, respectively.

In this manner, in the gas combustion treatment device 10A (10B to 10D), ammonia gas that has been stripped off from the waste water 105 separated at the water-washing step is used as the ammonia-containing gas 12. This eliminates a need to additionally supply ammonia as a reducing agent to the gas combustion treatment device 10A (10B to 10D) from outside. This also eliminates a need of discarding the ammonia, and thus eliminates a need of large equipment or the like that requires high temperature and high pressure for producing 100% ammonia, thereby downsizing and simplifying the treatment system. Ammonia is substantially not contained in the product gas 101 flowing through the gas line $L_3$ from the water-washing unit 104 to the $H_2S$ removal column 106 in FIG. 4, and all ammonia has been taken into the waste water. When ammonia having a concentration of approximately 1000 ppm, for example, is contained in the product gas 101 on the upstream side of the water-washing unit 104, the concentration decreases to 10 ppm or lower in the product gas on the downstream side of the water-washing unit 104. The position of the COS conversion unit 103 (step of converting COS contained in the product gas 101 into $H_2S$) is not limited to a particular one, and a mode of being provided on the upstream of the water-washing unit 104 as illustrated in FIG. 6, for example, may be used.

With the gas combustion treatment device and the gas combustion treatment method according to the present application, off-gases of the ammonia-containing gas 12, the hydrogen cyanide-containing gas 13, and the hydrogen sulfide-containing gas 14 can be subjected to combustion treatment in a single system, whereby individual treatment is not required and the treatment system is simplified.

The hydrogen cyanide-containing gas 13 formed as an off-gas in the waste-water treatment unit 113 can be treated and reduced into $N_2$ in the same manner, and can be detoxified completely without NOx being formed. Furthermore, by burning $NH_3$ off-gas, the cost for disposal of ammonia water is made unnecessary, for example, and thus running costs decrease.

According to the present application, by burning the ammonia-containing gas and the hydrogen cyanide in a reducing atmosphere and then burning and oxidizing the hydrogen sulfide-containing gas in the gas combustion treatment device including three sequential combustion units, all gases of the ammonia-containing gas, the hydrogen cyanide-containing gas, and the hydrogen sulfide-containing gas can be efficiently treated in a single treatment device.

Although this application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A gas combustion treatment device configured to subject an ammonia-containing gas, a hydrogen cyanide-containing gas, and a hydrogen sulfide-containing gas to combustion treatment comprising:
   a first combustion unit configured to introduce therein fuel, the ammonia-containing gas, the hydrogen cyanide-containing gas, and air to burn and reduce the fuel and the gases at an air ratio lower than 1, the air ratio being a value obtained by dividing an amount of air supplied for burning the fuel by a theoretical amount of air;
   a second combustion unit provided downstream of the first combustion unit and configured to burn and reduce, in a reducing atmosphere, nitrogen oxide in a first combustion gas sent from the first combustion unit; and
   a third combustion unit provided downstream of the second combustion unit and configured to introduce therein the hydrogen sulfide-containing gas with air in addition to a second combustion gas sent from the second combustion unit and burn the gases.

2. The gas combustion treatment device according to claim 1, wherein the hydrogen sulfide-containing gas is introduced with air into the second combustion unit to be burned and reduced.

3. The gas combustion treatment device according to claim 1, wherein the air ratio in the second combustion unit is higher than the air ratio in the first combustion unit.

4. The gas combustion treatment device according to claim 1, wherein a plurality of fuel introduction units configured to introduce the fuel into the first combustion unit is provided.

5. A gas combustion treatment method for subjecting an ammonia-containing gas, a hydrogen cyanide-containing gas, and a hydrogen sulfide-containing gas to combustion treatment comprising:
   a first combustion step of introducing fuel, the ammonia-containing gas, the hydrogen cyanide-containing gas, and air for burning and reducing the fuel and the gases at an air ratio lower than 1, the air ratio being a value obtained by dividing an amount of air supplied for burning the fuel by a theoretical amount of air;
   a second combustion step, performed downstream of the first combustion step, for burning and reducing, in a reducing atmosphere, nitrogen oxide in a first combustion gas sent from the first combustion step; and
   a third combustion step, performed downstream of the second combustion step, for introducing the hydrogen sulfide-containing gas with air in addition to a second combustion gas sent from the second combustion step, and for burning the gases.

6. The gas combustion treatment method according to claim 5, wherein at the second combustion step, the hydrogen sulfide-containing gas is introduced with air to be burned and reduced.

7. The gas combustion treatment method according to claim 5, wherein the air ratio at the second combustion step is higher than the air ratio at the first combustion step.

8. A gas purification system comprising:
   a gasification power plant including a gasification furnace configured to produce a product gas from fuel and an oxidizing agent;
   a carbonyl sulfide (COS) conversion unit configured to convert COS in the product gas produced in the gasification furnace into hydrogen sulfide;
   a water-washing unit provided downstream of the COS conversion unit and configured to wash the product gas;
   a hydrogen sulfide removal column provided downstream of the water-washing unit and configured to remove hydrogen sulfide in the product gas;
   an ammonia removal unit configured to remove ammonia in waste water sent from the water-washing unit;
   a waste-water treatment unit configured to treat the waste water from which ammonia has been removed; and
   the gas combustion treatment device according to claim 1 configured to subject a gas containing hydrogen sulfide from the hydrogen sulfide removal column, a gas containing ammonia from the ammonia removal unit, and a gas containing hydrogen cyanide from the waste-water treatment unit to combustion treatment.

* * * * *